US006293868B1

(12) United States Patent
Bernard

(10) Patent No.: US 6,293,868 B1
(45) Date of Patent: Sep. 25, 2001

(54) STADIUM GAME FOR FANS

(76) Inventor: Glenn R. Bernard, 3611 Chesire, Carlsbad, CA (US) 92008-7002

( * ) Notice: Subject to any disclaimer, the term of this patent is extended or adjusted under 35 U.S.C. 154(b) by 0 days.

(21) Appl. No.: 08/950,097

(22) Filed: Oct. 14, 1997

Related U.S. Application Data

(63) Continuation-in-part of application No. 08/613,209, filed on Mar. 8, 1996.

(51) Int. Cl.[7] .................................................... G06F 19/00
(52) U.S. Cl. .................................................... 463/42; 463/4
(58) Field of Search .............................. 463/42, 9, 4, 40, 463/41, 36, 30, 31

(56) References Cited

U.S. PATENT DOCUMENTS 4,141,548 * 2/1979 Everton .................................... 463/4
4,496,148 * 1/1985 Morstain et al. ......................... 463/9
4,592,546 * 6/1986 Fascenda et al. ...................... 463/41
4,722,526 * 2/1988 Tovar et al. ............................. 463/9
4,745,468 * 5/1988 Von Kohorn .......................... 463/40
5,013,038 * 5/1991 Luxenberg et al. ................... 463/40
5,374,060 * 12/1994 Goldberg ............................... 463/25

* cited by examiner

*Primary Examiner*—Valencia Martin-Wallace
*Assistant Examiner*—John Paradiso
(74) *Attorney, Agent, or Firm*—John R. Ross; John R. Ross, III

(57) ABSTRACT

A game which is played by fans of sports events such as baseball, football, basketball and soccer. Each player makes advance predictions as regarding the outcome they expect to occur during the event. The player records his predictions in a form that can be checked by a computer. The record of the player's predictions is either transmitted to a remote analysis location or is analyzed within the computer in which the predictions were made. The predictions of each player are analyzed and compared to actual actions occurring during the event, and scores are given to each player based on the accuracy of his predictions. In a preferred embodiment predictions are made on scan cards that are manually collected and then automatically read and scored by computer controlled equipment made by Scantron Corporation. In another preferred embodiment, predictions and actual results are entered into a personal computer that analyzes the predictions for accuracy.

18 Claims, 12 Drawing Sheets

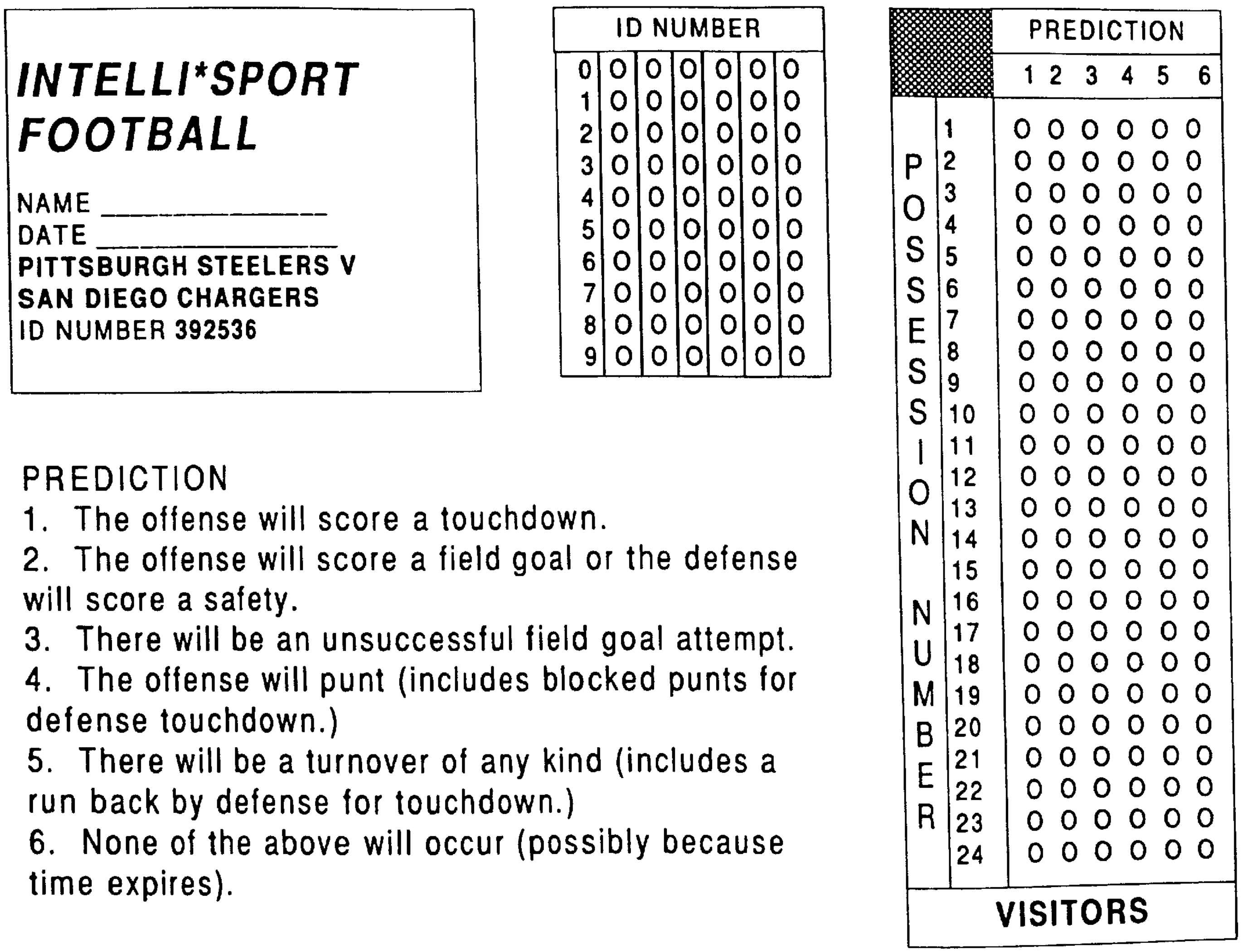

PREDICTION

1. The offense will score a touchdown.
2. The offense will score a field goal or the defense will score a safety.
3. There will be an unsuccessful field goal attempt.
4. The offense will punt (includes blocked punts for defense touchdown.)
5. There will be a turnover of any kind (includes a run back by defense for touchdown.)
6. None of the above will occur (possibly because time expires).

FIG. 2A

| A | A | B | C | D | E | F | G | H | I | J | K | L |
|---|---|---|---|---|---|---|---|---|---|---|---|---|
| 1 | | | | | | | | | | | | |
| 2 | | | | | | | | | | | | |
| 3 | | *INTELLI*SPORT BASEBALL* | | | | | | | | | | |
| 4 | | *GAME 'A'* | | | | | | | | | | |
| 5 | | *PLAYER :* | *SAM* | | | | | | | | | |
| 6 | | | | | | | | | | | | |
| 7 | | | | | | | | | | | | |
| 8 | | | | | | | INNINGS | | | | | |
| 9 | | | | 1st | 2nd | 3rd | 4th | 5th | 6th | 7th | 8th | 9th |
| 10 | | | | | | | | | | | | |
| 11 | | VISITOR | RUNS | | | | | | | | | |
| 12 | | PREDICTED | HITS | | | | | | | | | |
| 13 | | | ERRORS | | | | | | | | | |
| 14 | | VISITOR | RUNS | | | | | | | | | |
| 15 | | ACTUAL | HITS | | | | | | | | | |
| 16 | | | ERRORS | | | | | | | | | |
| 17 | | YOUR SCORE | | 0 | 0 | 0 | 0 | 0 | 0 | 0 | 0 | 0 |
| 18 | | | | | | | | | | | | |
| 19 | | | | | | | | | | | | |
| 20 | | HOME TEAM | RUNS | | | | | | | | | |
| 21 | | PREDICTED | HITS | | | | | | | | | |
| 22 | | | ERRORS | | | | | | | | | |
| 23 | | HOME TEAM | RUNS | | | | | | | | | |
| 24 | | ACTUAL | HITS | | | | | | | | | |
| 25 | | | ERRORS | | | | | | | | | |
| 26 | | YOUR SCORE | | 0 | 0 | 0 | 0 | 0 | 0 | 0 | 0 | 0 |
| 27 | | | | | | | | | | | | |
| 28 | | **TOTAL SCORE:** | | **0** | | | | | | | | |
| 29 | | | | | | | | | | | | |
| 30 | | | | | | | | | | | | |
| 31 | | | | | | | | | | | | |
| 32 | | | | | | | | | | | | |
| 33 | | | | | | | | | | | | |
| 34 | | | | | | | | | | | | |
| 35 | | | | | | | | | | | | |
| 36 | | | | | | | | | | | | |
| 37 | | | | | | | | | | | | |
| 38 | | | | | | | | | | | | |
| 39 | | | | | | | | | | | | |
| 40 | | | | | | | | | | | | |
| 41 | | | | | | | | | | | | |
| 42 | | | | | | | | | | | | |
| 43 | | | | | | | | | | | | |
| 44 | | | | | | | | | | | | |
| 45 | | | | | | | | | | | | |
| 46 | | | | | | | | | | | | |
| 47 | | | | | | | | | | | | |
| 48 | | | | | | | | | | | | |

FIG. 7

| G | A | B | C | D | E | F | G | H | I | J | K | L |
|---|---|---|---|---|---|---|---|---|---|---|---|---|
| 1 | | | | | | | | | | | | |
| 2 | | | | | | | | | | | | |
| 3 | | | | | | INNINGS | | | | | | |
| 4 | | | 1st | 2nd | 3rd | 4th | 5th | 6th | 7th | 8th | 9th | TOTAL |
| 5 | PLAYER 'A': | SAM | 0 | 0 | 0 | 0 | 0 | 0 | 0 | 0 | 0 | 0 |
| 6 | PLAYER 'B': | GEORGE | 0 | 0 | 0 | 0 | 0 | 0 | 0 | 0 | 0 | 0 |
| 7 | PLAYER 'C': | FRED | 0 | 0 | 0 | 0 | 0 | 0 | 0 | 0 | 0 | 0 |
| 8 | PLAYER 'D': | JOE | 0 | 0 | 0 | 0 | 0 | 0 | 0 | 0 | 0 | 0 |
| 9 | PLAYER 'E': | SARA | 0 | 0 | 0 | 0 | 0 | 0 | 0 | 0 | 0 | 0 |
| 10 | PLAYER 'F': | RALPH | 0 | 0 | 0 | 0 | 0 | 0 | 0 | 0 | 0 | 0 |
| 11 | | | *INTELLI*SPORT SCOREBOARD* | | | | | | | | | |

FIG. 8

STADIUM GAME FOR FANS

This application is a continuation-in-part of Ser. No. 08/613,209 filed Mar. 8, 1996. This invention relates to games and in particular to games of chance.

BACKGROUND OF THE INVENTION

Games of chance are well known. These games include lotteries and casino gambling. Where it is legal, games that involve betting on the outcome of sporting events are also very popular. These games include football, baseball, boxing, horse racing and others.

Computer systems exist for reading coded information directly into a computer memory so that the information can be processed by the computer.

The technology exists to establish a Local Area Network or LAN. A LAN is a distributed network of computers that are interlinked so that they exchange information with each other.

The Internet is a large scale computer network that is operated to enable persons from all over the world to exchange information and files via their personal computers.

SUMMARY OF THE INVENTION

The present invention provides a game which is played by fans of sports events such as baseball, football, basketball, soccer hockey and golf. Each player makes advance predictions regarding the actions they expect to occur during the event. The player records his predictions in a form that can be checked by a computer. The predictions of each player are analyzed by a computer and compared to actual outcomes occurring during the event and scores are given to each player based on the accuracy of his predictions. Any number of prizes may be awarded based on the scores. In a preferred embodiment, predictions are made on cards that are manually collected and then automatically read and scored by computer-controlled equipment made by Scantron Corporation (or one of Scantron's Competitors). In another preferred embodiment, predictions are transmitted electronically from the player's stadium seat to the analysis location. In another preferred embodiment, television viewers are permitted to play via the Internet. In another preferred embodiment, players in the comfort of their homes are able to enter predictions and actual results into an electronic "game-box" or a personal computer that contains software designed to analyze the accuracy of the predictions. In a preferred embodiment played at baseball events, players predict the number of hits, runs and errors in each inning. In a variation, the player predicts whether the batter will, one way or another, safely reach at least first base. Extra points can be given for predicting the final score. In a preferred embodiment played at a football event, the player would predict the result of each drive by choosing one of the following: 1) offense scores a touchdown, 2) offense scores field goal or defense scores safety, 3) field goal attempt is unsuccessful, 4) offense punts, 5) turnover other than punt, or 6) none of the above. Preferably this football embodiment of the game is played with equipment that permits each player to make his prediction just before the start of the drive. Preferably, the names of the leaders of the game are flashed on the stadium scoreboard at intervals during the game to increase player interest.

BRIEF DESCRIPTION OF THE DRAWINGS

FIG. 2A shows a portion of a scan card for playing a football version of the present invention.

FIG. 7 shows the first page of a spreadsheet.

FIG. 8 shows the seventh page of a spreadsheet.

DETAILED DESCRIPTION OF PREFERRED EMBODIMENTS

A preferred embodiment of the present invention can be described by reference to the drawings.

BASEBALL GAME PLAYED AT STADIUM USING SCAN CARD

Figure 1A:
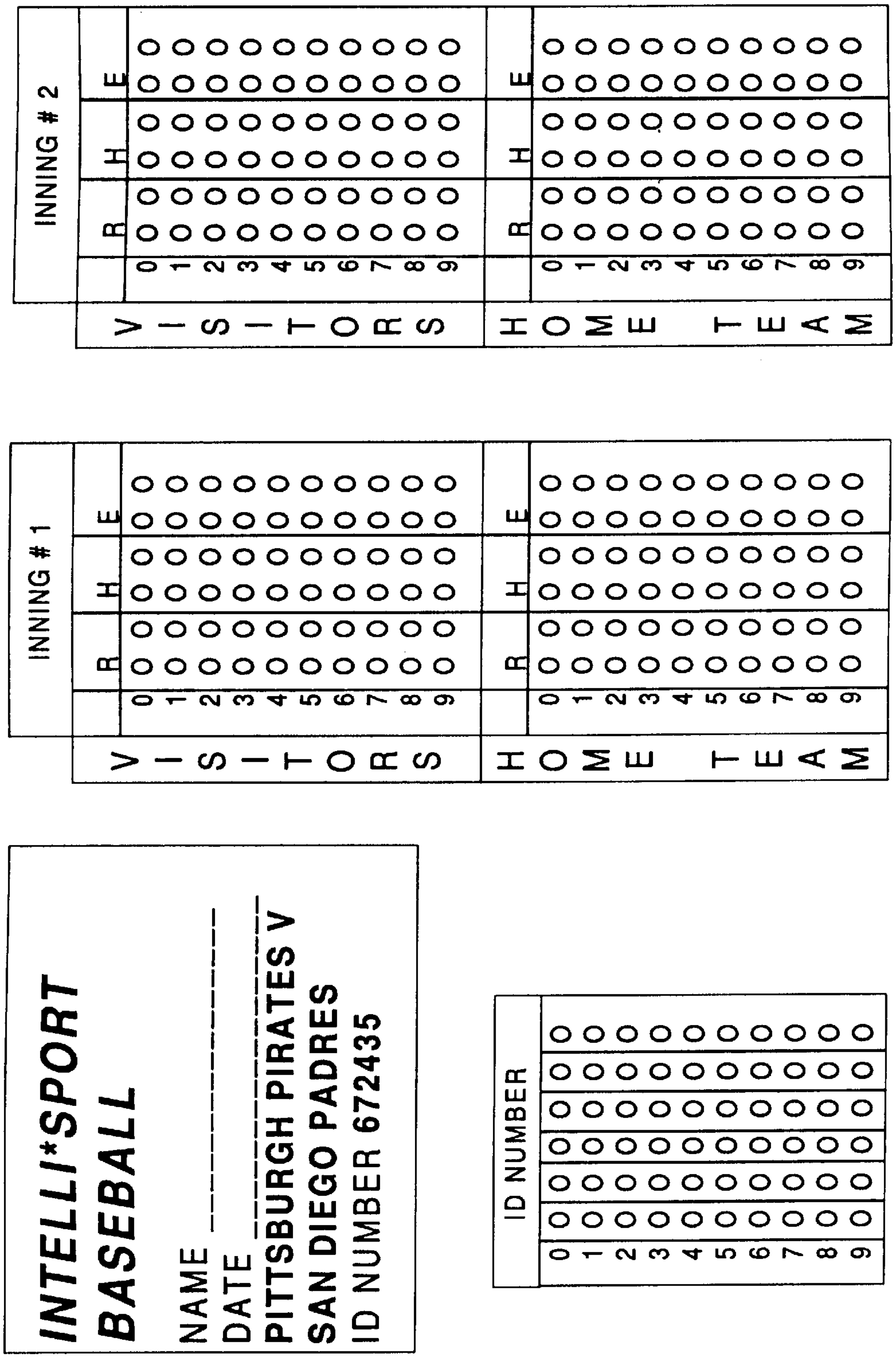
FIG. 1A shows a portion of a scan card for playing a baseball version of the present invention.
Figure 1B:
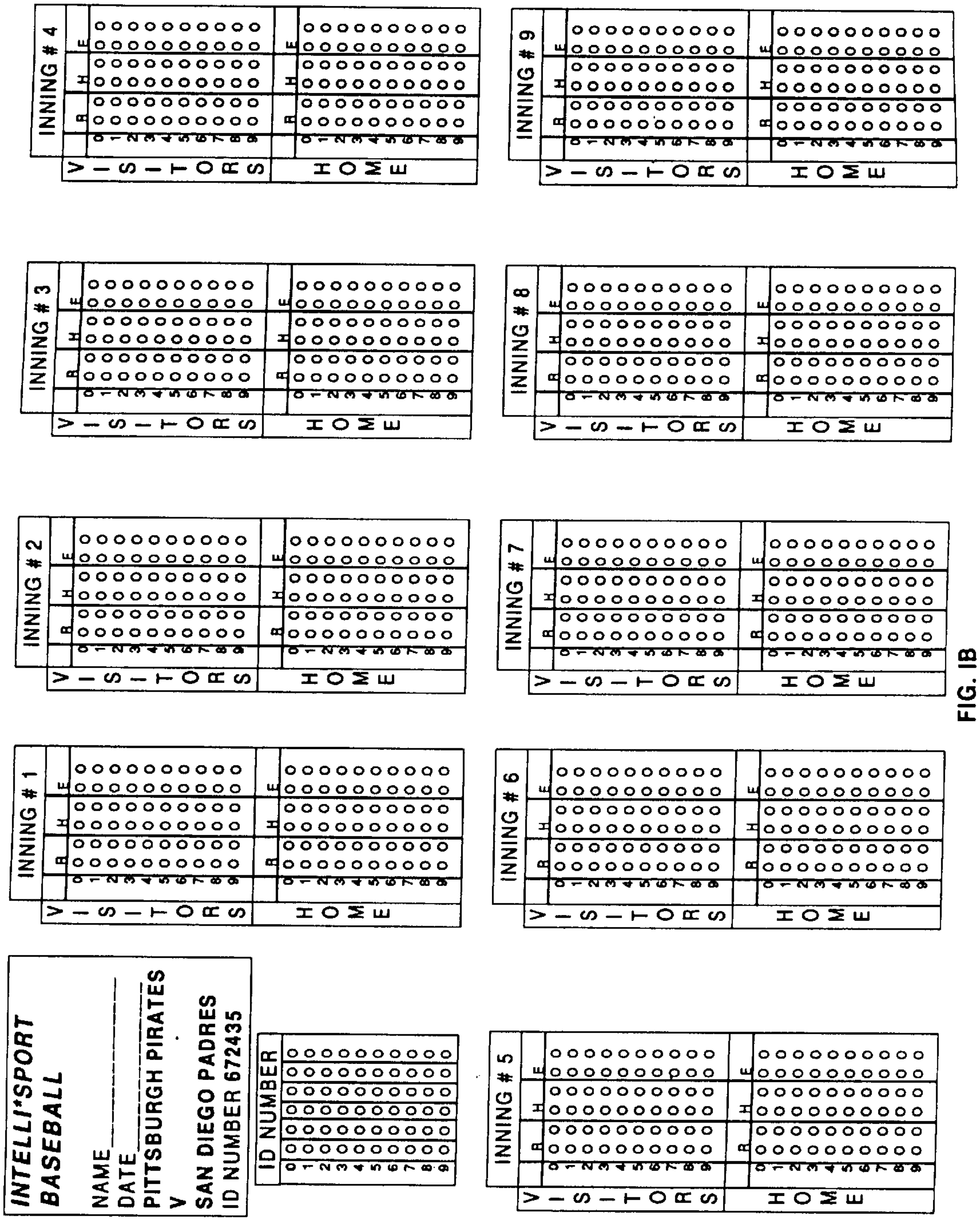
FIG. 1B shows the complete baseball scan card, actual size.

In the preferred embodiment played at baseball events, the object of the game is for the player to predict the number of hits, runs and errors scored in each inning. The player who proves to be the most accurate at predicting, is the winner. Each player will enter his predictions on a scan card that is given to him when he enters the stadium. A preferred version of this scan card is shown in FIGS. 1A and 1B. The player will write his name somewhere on the scan card. The ID number of each player is preprinted on the ticket. For each inning, the player predicts how many runs, hits and errors will occur for each team. He will record his predictions by shading in the appropriate circles.

After having filled out the scan card, the player delivers his scan card to the prescribed collection point for analysis. The completed scan card is taken to a card reader which may be located throughout the stadium at various locations. The player's predictions are digitally recorded by inserting the card into a card reader where it is read automatically. A possible choice for the card reader is Scantron's Scan Mark 2500 which has a scanning rate of 120 sheets per minute. Another choice is the "SR-600F" Auto Feed Unit provided by Scanning Systems. The information provided by the player is stored in a digital form so that the information can be readily recalled by a computer processor. All of the Scantron readers at the stadium will be tied together into a central computer or a system of computers. Preferably, the predictions of all players are grouped by the computer system into a matrix of all possible actual events so that the computer system 'knows' the identification numbers of all players who predicted correctly each actual event. Therefore, immediately after the completion of each inning, the computer can pull up the identification number of the correctly predicting players and award them points without having to search all input data. As the game is played, the central computer awards points for each correct prediction and applies the points to the ID number of the player making the correct prediction. The stadium's scoreboard preferably will display the identification numbers and the names of the players who have the best scores as the game progresses. At the end of the event, the player or players with the highest score (i.e., the player or players who were the most successful at predicting), will be declared the winner and can be given a prize.

In developing the rules for this embodiment, one objective is to avoid having too many winners. For example, if 10 percent of a crowd of 30,000 won, dealing with all of the winners could prove difficult. Thus, I have established a format which, under the rules of probability, minimizes the likelihood of a tie. For example, in the baseball embodiment described above, the chance of a perfect score of 54 is very low. By way of illustration, if we knew in advance that all actual events were going to be 1 or 0 (for example, 1 hit or zero hits each inning) each with equal probability, the chance of a perfect score would be $0.5^{54}$ or one chance in $1.8\times10^{16}$. Thus, it is not likely that there will be any perfect scores. However, there could be a tie for first place. I expect the number of ties for first place to normally be low, since a chart of the scores of the players will typically result in a bell shaped curve with fewer and fewer scores at the top. A sponsor might want to divide a single prize between persons who tie for the highest score or require some additional predictions on the scan card for the purpose of breaking ties. These could be, for example, naming players predicted to hit home runs, predicting the total number of strike-outs, walks and predicting the final score.

BASEBALL GAME PLAYED USING LOCAL AREA NETWORK

Figure 5:
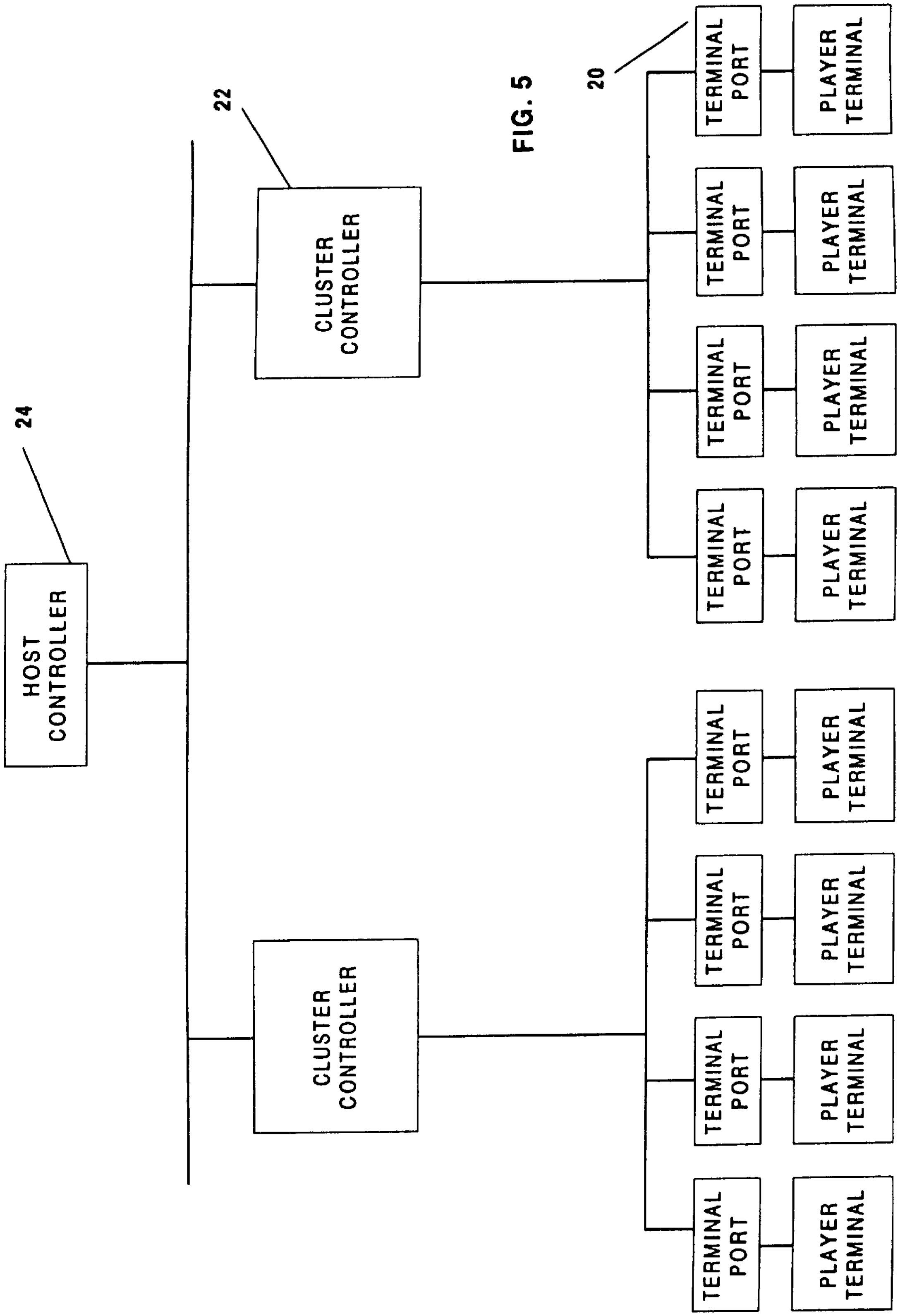
FIG. 5 shows an embodiment of the present invention which utilizes a Local Area Network (LAN) of digital computer devices.
Figure 6:
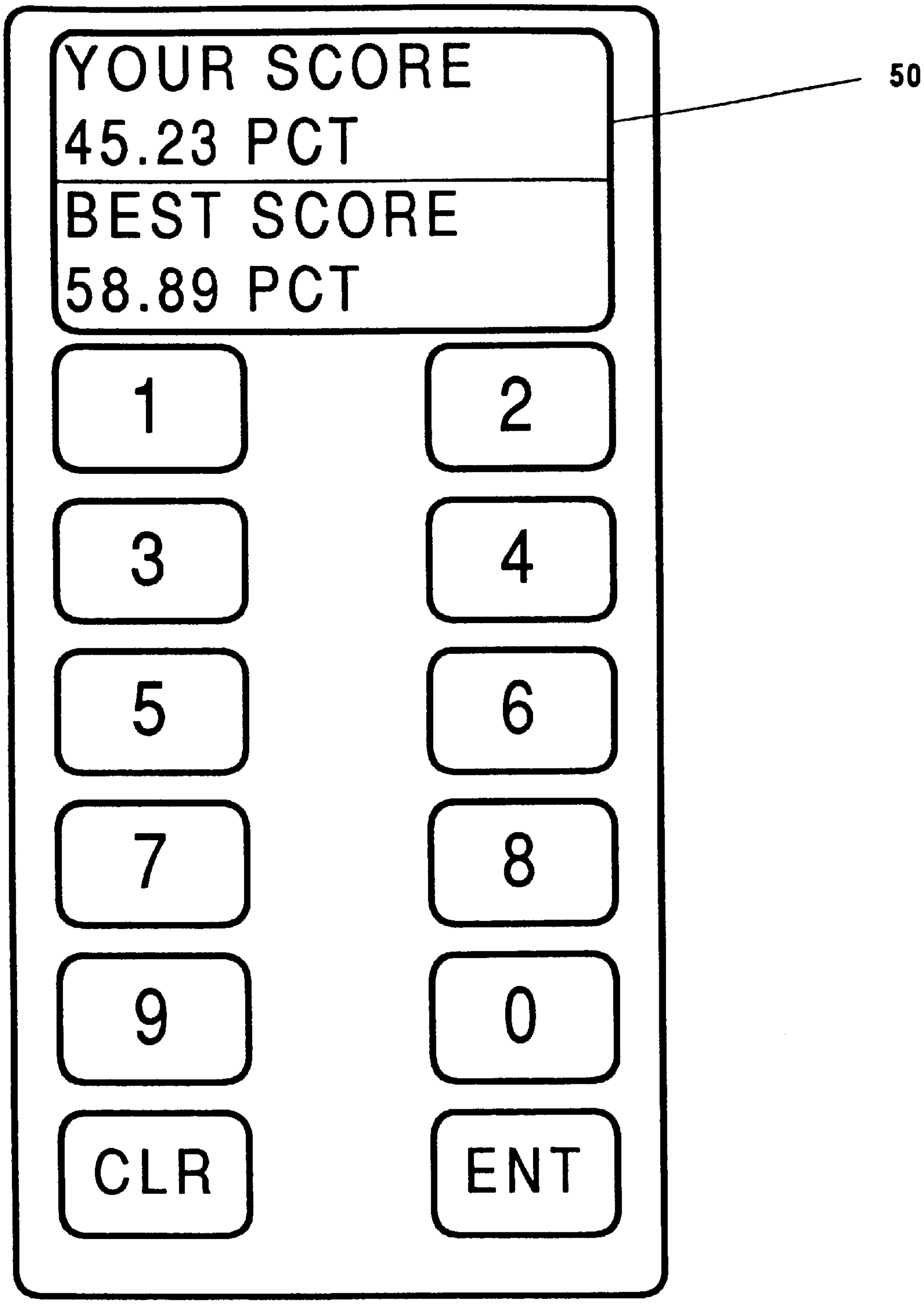
FIG. 6 is a drawing of the face of a player terminal used in the FIG. 5 embodiment.

In another preferred embodiment, described by reference to FIG. 5, predictions are transmitted electronically from the fan's stadium seat to the analysis location. The player can access the analysis location via a Local Area Network (LAN), which in this embodiment is provided by the stadium. The player makes his entry through a remote entry device called the Player Terminal 20. A drawing of the face of a Player Terminal is shown in FIG. 6. The player is prompted to enter his prediction through instructions provided to the player by the host computer which is displayed in window 50. Other information can be provided through window 50 such as the player's score compared to the best score, as shown in FIG. 6. Up to about one thousand Player Terminals are connected to a Cluster Controller 22 via Player Terminal Ports 20. The Cluster Controller is a specialized computer system that is capable of managing interactions with a large number of Player Terminals. A 30,000 seat stadium would have about 30 Cluster Controllers. The Host Controller is the nerve center of the system. The player who has made the most accurate predictions will be the winner. The advantage of this embodiment over the Scan card-Scantron reader embodiment is that it becomes possible for the player to make predictions throughout the course of the sports event. For example, in baseball, he can predict what the next player will do. In football, he can predict whether a score will occur the next time that the ball legally is put into play.

INTERNET EMBODIMENT

In another preferred embodiment, the opportunity to play is extended to fans watching the event on their home television sets. Predictions are transmitted electronically from the player's personal computer to the analysis location. The player can access the analysis location via the Internet and World Wide Web. The sporting event's sponsors will host a corresponding Web page. The player, while watching the event over his television set, can make predictions about the outcome of the sporting event through his personal computer that is accessing the Web page via the Internet. As with the stadium LAN system, it is also possible for the player to make predictions during the sports event. The operator may require players to pay to play the game which can be done by having players transmit their credit card number. The winner's prize could be easily paid by crediting the winning player's credit card with the amount of the prize. A T.V. advertizer sponsoring the television broadcast of a stadium game could make its web site available to players. A player with a personal computer could download software from the Web site, insert his predictions and transmit them back to the sponsor's Web site where the predictions could be entered into the sponsor's computer. The sponsor could use part of his advertisement space on the TV broadcast to inform leading players of their scores during the broadcast of the game. The advertiser could permit fans to play for free and give prizes or he could charge people to play and provide larger prizes.

FOOTBALL

Figure 2B:
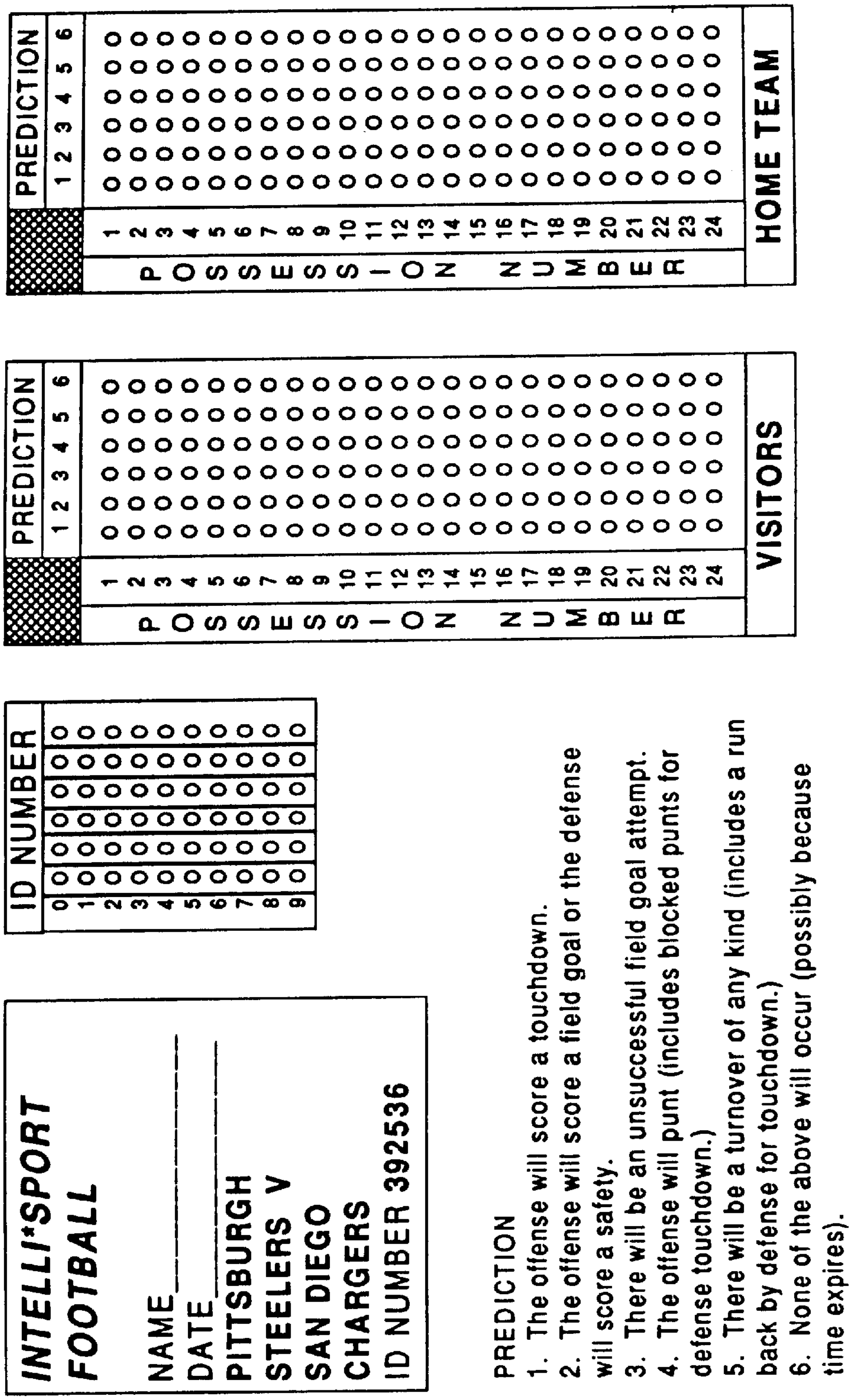
FIG. 2B shows the complete football scan card, actual size.

In a preferred embodiment played at football events, the object of the game is for the player to predict how each possession will end for both teams. The player will enter his predictions on a scan card that is given to him when he picks up his ticket. A version of this scan card is shown in FIGS. 2A and 2B. The player will write (in the upper left-hand corner of the scan card) his name and the date. The teams that are playing and his ID number from his ticket are preprinted on the scan card. He will then shade in the appropriate circles on the scan card to record his prediction of what will happen on each possession for both the visitors and the home team.

BASKETBALL

Figure 3A:
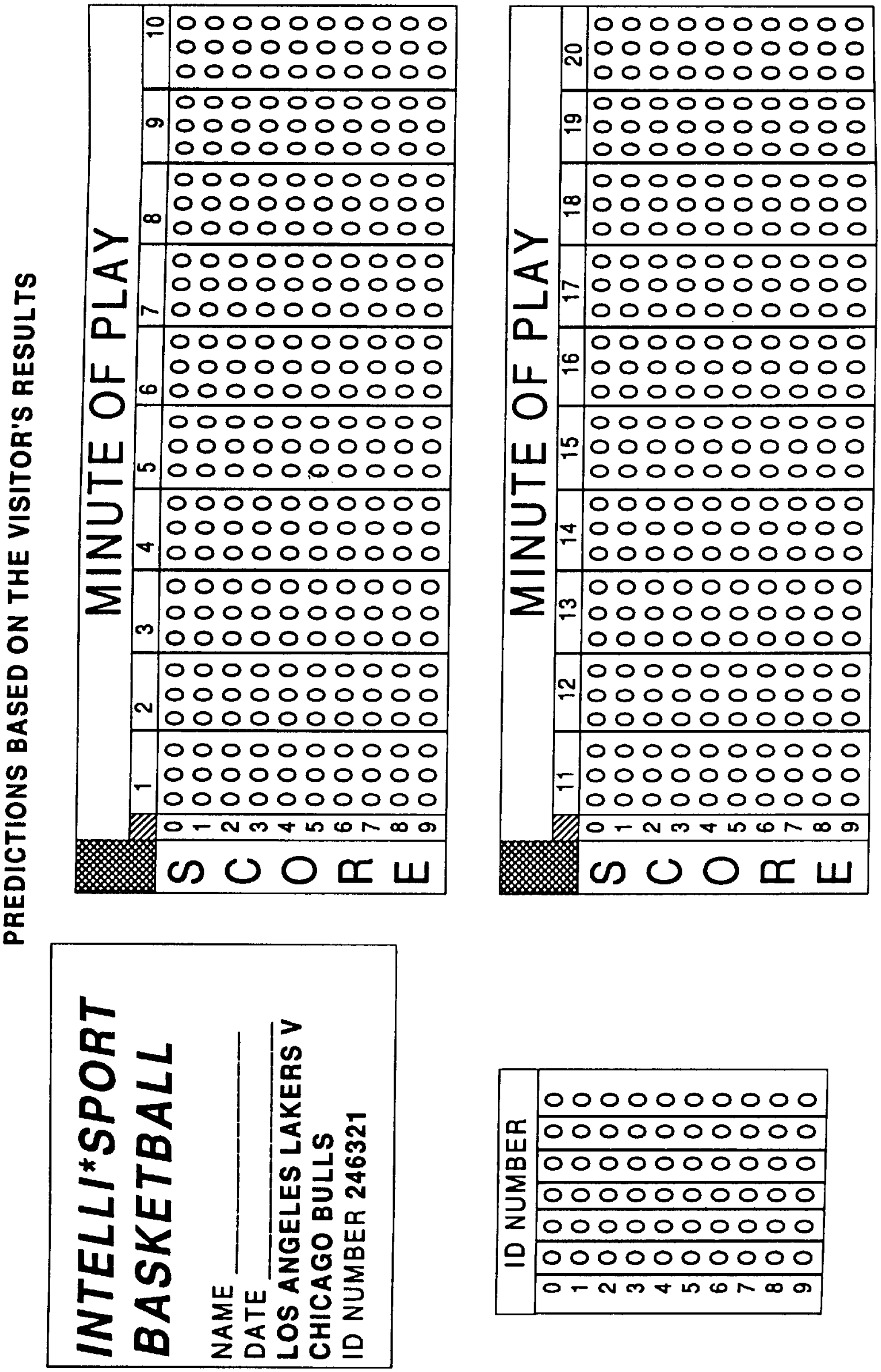
FIG. 3A shows a portion of a scan card for playing a basketball version of the present invention.
Figure 3B:
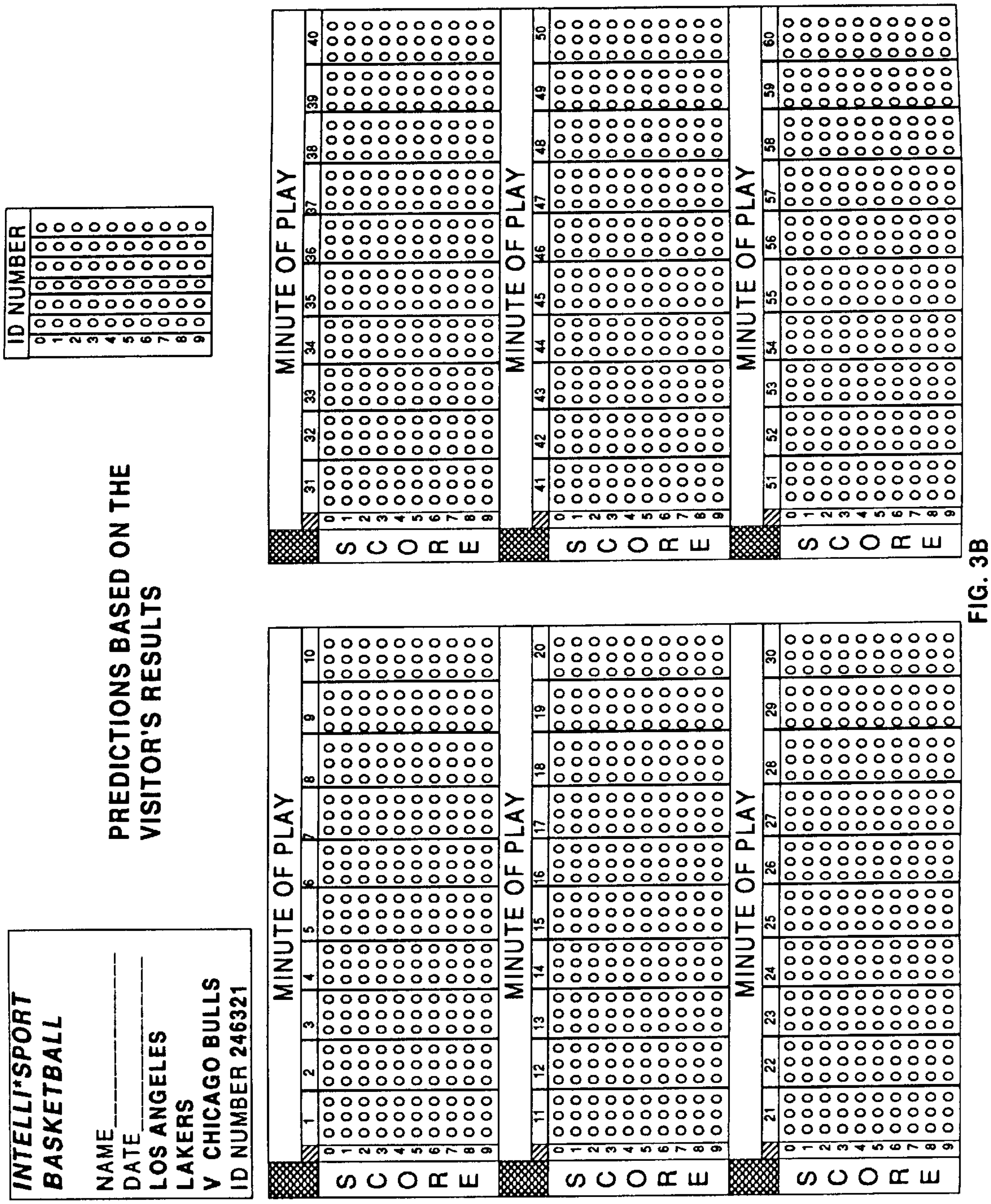
FIG. 3B shows the complete basketball scan card, actual size.

In a preferred embodiment played at basketball games, the object of the game is for the player to predict what the total score will be at the end of each minute of play. A preferred scan card for this game is shown in FIGS. 3A and 3B.

SOCCER

Figure 4A:
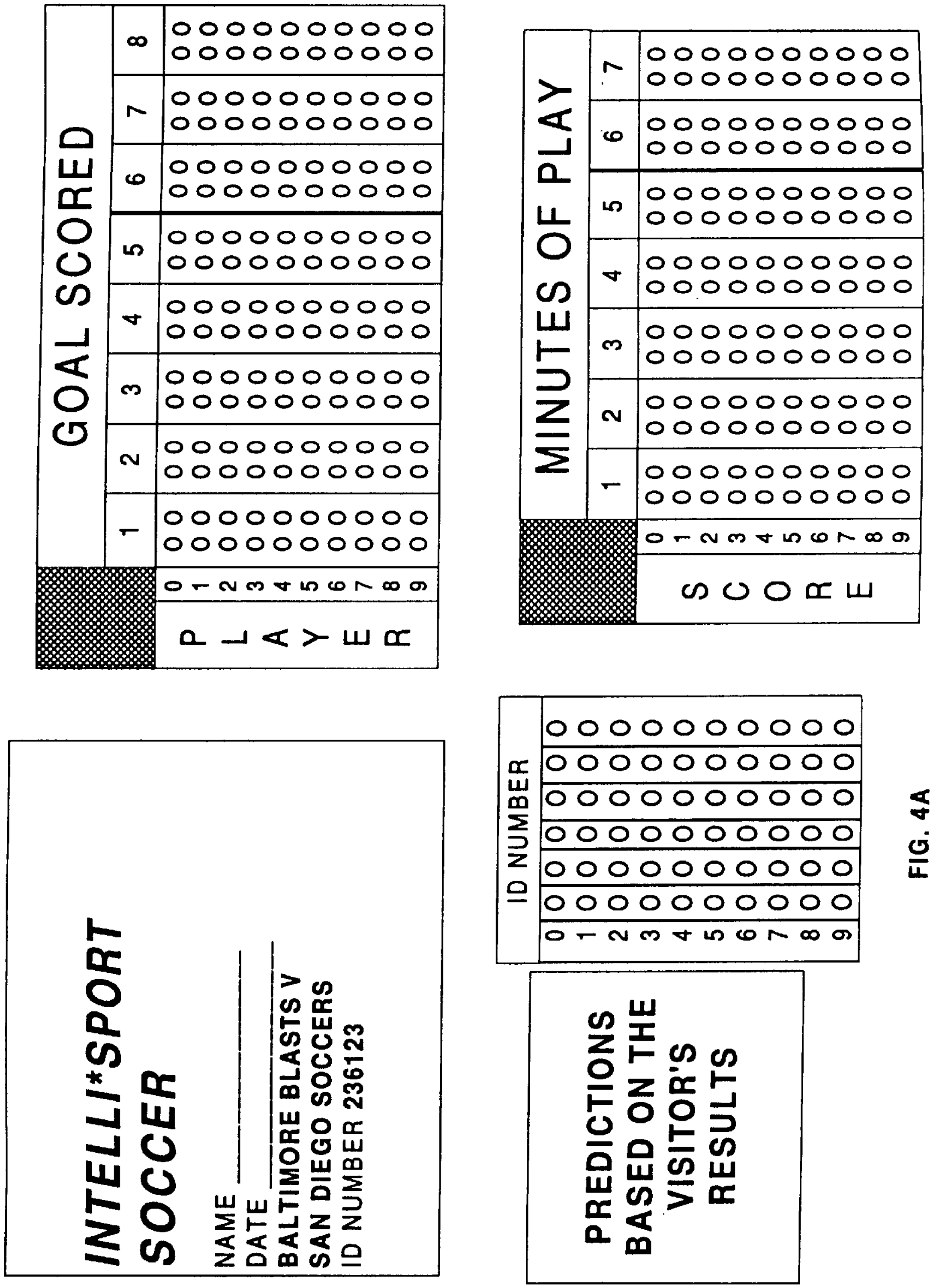
FIG. 4A shows a portion of a scan card for playing a soccer version of the present invention.
Figure 4B:
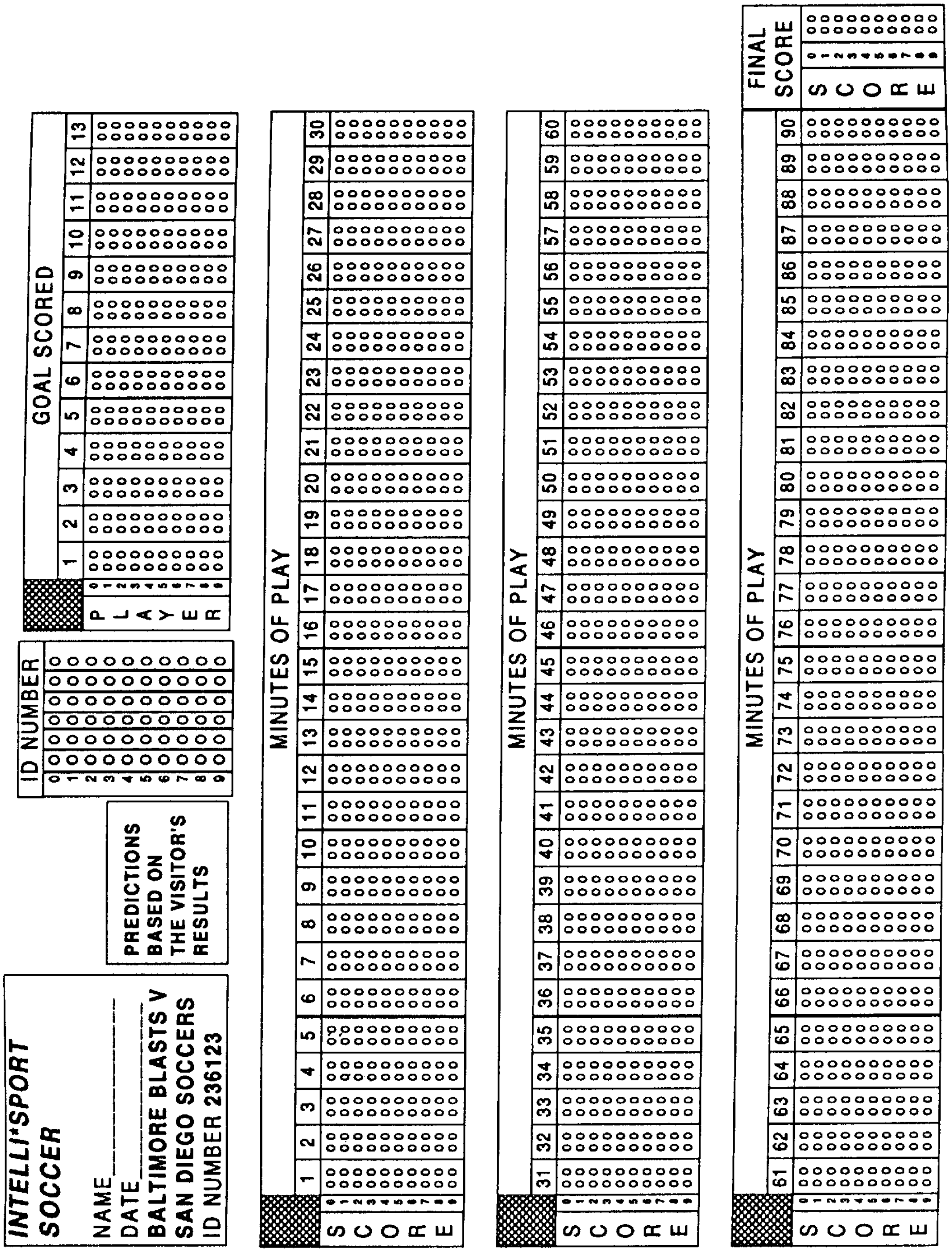
FIG. 4B shows the complete soccer scan card, actual size.

In a preferred embodiment played at soccer games, the object of the game is for the player to make predictions based on the performance of the visitors and the home team. One scan card is for predictions based on the home team's performance, the other scan card is for predictions based on the visitor's performance. A version of the scan card for visitor predictions is shown in FIGS. 4A and 4B. In the upper right-hand corner of the scan card, the player will predict the soccer player who will make the first goal for the visitors, the second goal, the third goal, and so forth all the way up to the thirteenth goal. He will record this prediction by shading in the player's jersey number that corresponds with the goal that might be scored. Then, the player will predict what the visitor's score will be at the end of each minute of play until the end of the game. The player then will predict the final score of the match in the last column. This prediction will be different then the score at the end of 90 minutes of play whenever there is a tie and overtime play is necessary. He will record his prediction by shading in the appropriate circles on the scan card shown in FIG. 4B. After filling in the predictions for the visitors, he will repeat the process for the home team.

GOLF

In a preferred embodiment played in connection with golf tournaments, the object of the game is for the player to make predictions based on the performance of individual golfers entered in the tournament. For example, before the start of the tournament each player will select who the top five golfers will be at the completion of the tournament and their order of finish. If the player correctly predicts both the fact that a golfer finished in the top five and his order of finish, the player will receive 20 points. If the player correctly predicts only the fact that the golfer finishes in the top five but incorrectly predicts the order of finish, the player will receive 10 points. If the player predicts that a golfer will finish in the top five and the player is wrong, the player will lose 5 points. Also, on another sheet, each player will choose golfers to follow for the duration of the game. The player will predict how the golfer will perform for each hole by selecting either a guess of "par", "below par" or "above par". For each correct guess of "par", the player gets 5 points. For each correct guess of "below par" or "above par", the player gets four points.

Another embodiment of the golf game is outlined below: Players pick:

1) Tournament winner

2) Four other golfers to finish in the top 5, and

3) Scores for the 5 picked golfers on the last 18 holes

| Scoring is as follows: | Points |
|---|---|
| Tournament winner picked correctly | 100 |
| All five picked golfers in first five | 300 |
| 4 of 5 in first 5 | 200 |
| 3 of 5 in first 5 | 100 |
| 2 of 5 in first 5 | 50 |
| 1 of 5 in first 5 | 20 |
| Hole in one | 100 |
| Double eagle | 30 |
| Eagle | 10 |
| Birdie | 5 |
| Par | 3 |
| Bogie | 2 |
| Double bogie or more | 1 |

PERSONAL COMPUTER EMBODIMENT

In another preferred embodiment, players compete against each other by entering their predictions into a personal computer (or a dedicated "Game Box") that has been programmed to compare predictions to actual performance and assign points based on accuracy. In one version of this embodiment, the computer processing unit (CPU) is a 486 IBM compatible personal computer manufactured by Packard Bell. The players enter their predictions via a keyboard and the results of the analysis are displayed on a monitor (keyboard and monitor are also both manufactured by Packard Bell). The programming that analyzes the player's inputs is written into a spreadsheet. In a prototype demonstration game actually developed by the applicant's consultant, the spreadsheet was "Quattro Pro 7", manufactured by the Corel Corporation with offices in Ontario, Canada. The minimum system requirements for Quattro Pro 7 are: (1) PC 486/25 processor, 486/66 recommended, (2) Windows 95, (3) CD-ROM drive, 2x recommended, to access all applications, fonts and clipart, (4) 8 MB RAM, 16 recommended, (5) VGA monitor, (6) Mouse or tablet, (7) 12 MB–103 MB hard disk space, depending on configuration.

PROGRAMMING THE SPREADSHEET

Spreadsheet Operation

The programmer first opens Quattro Pro 7 to a blank spreadsheet file where he will observe the first page of that file; page 'A'. The rows for each page are labeled consecutively 1, 2, 3, 4, etc., and the columns for each page are labeled consecutively A, B, C, D, etc., as shown in FIG. 7. Each rectangular intersection of column and row is called a cell and is referenced by first naming the column and then the row. For example, in FIG. 7, "GAME 'A'" is at B4 and "PLAYER:" is at B5. The programmer can input either a number, a label or a formula into a cell.

Programming the Preferred Embodiment

The programmer creates the preferred embodiment by making entries into cells. A preferred complete computer program listing which has been programmed and listed by applicant and his consultants is provided in appendix A. The program is described in detail as follows:

When referring to cell entries, the first letter on each line refers to the page number of the spreadsheet. In other words, "A:B3" indicates that cell B3 is on the first page of the spreadsheet, whereas "B:B3" indicates that cell B3 is on the second page of the spreadsheet. If no letter is placed in front of the cell, that means that the cell being discussed is on the current page. Finally, the label or formula listed next to each cell position refers to what the programmer inputs into that position. For example, B11=VISITOR means that the label "VISITOR" is in cell B11 on the current page.

FIRST PAGE OF THE SPREADSHEET FIRST PLAYER

Cells B3 through B5 and C6

Cells B3 through B5 are the labels "INTELLI*SPORT BASEBALL", "GAME 'A'", and "PLAYER:". Cell C6 is a formula that asks the first player to enter his name into blank cell C5. If cell C5 contains a player's name, cell C6 displays nothing. However, if cell C5 is blank, cell C6 displays the phrase, "Enter Player Name."

Cell G8 and Cells D9 through L9

Cell G8 contains the label "INNINGS". Cells D9 through L9 contain labels describing the inning number (1st through 9th).

FIRST PLAYER—VISITORS

Cells B11, B12, B14, B15, and C11 through C16

Cells B11, B12, B14, B15, and C11 through C16 contain labels that describe the manner in which the first player compares his predictions of the Runs, Hits and Errors of the Visitor's turn at-bat with the actual results of the Visitor's at-bat. For example, in the first inning in cells D11 through D13 the first player enters his predictions of Runs, Hits and Errors. Then, when the visitors have completed their at-bat, the first player will enter the actual results in cells D14 through D16. The first player will continue to make entries in this manner, so that the block of cells D11 through L16 are filled with his predictions and the actual results from the visitor's at-bat.

Cell Block D33 through L38

The block of cells D33 through L38 serve the function of ensuring that if the first player makes a prediction greater than 6 or the actual result is greater than 6, the spreadsheet will treat that number as if it were a 6. The cells in the block are comprised of formulas whose function is to analyze inputs that were made into the block of cells D11 through L16. For example, cell D33 looks to cell D11 and if cell D11 is blank (in other words, the first player has not made any entry at all), cell D33 will return the arbitrary number "999". If cell D11 contains a number that is greater than 6, cell D33 will return a 6. Otherwise, cell D33 will return whatever number has been entered into cell D11. In the same manner, all the other cells in cell block D33 through L38 will analyze cell block D11 through L16, returning either "999", "6", or whatever number was entered into a cell in cell block D11 through L16.

Cell B17 and Cells D17 through L17

Cell B17 contains the label "YOUR SCORE" and shows where the first player's score indicating his accuracy at predicting will be displayed. Cell block D17 through L17's purpose is to analyze cell block D33 through L38 and return a "score" based on the accuracy of prediction. For example, cell D17 first looks to cells D33 through D38. If any of these =999 (indicating blank cells for the predictions or actual results), the cell returns a score of 0. If, however, none of these =999, cell D17 will analyze cells D33 through L38 and return a score in accordance with the following parameters. Every correctly guessed '0' scores one point. Every other correctly guessed prediction is to be tippled. For example, a correctly guessed '2' scores 6 points; a correctly guessed '5' scores 15 points; and a correctly guessed 6 scores 18 points. Whenever a player perfectly predicts all 3 answers for a team's at-bat (i.e., he correctly predicts the runs, hits and errors), the player will receive bonus points as follows: two bonus points if he correctly guesses "0-0-0", six bonus points if he correctly predicts any other sequence. In this same manner, cells D17 through L17 analyze cell block D33 through L38 to determine the first player's score for the visitor's at-bat.

FIRST PLAYER—HOME TEAM

Cells B20, B21, B23, B24, and C20 through C25

Cells B20, B21, B23, B24, and C20 through C25 contain labels that describe the manner in which the first player compares his predictions of the runs, hits and errors of the home team's turn at-bat with the actual results of the home team's at-bat. For example, in the first inning in cells D20 through D22 the first player enters his predictions of runs, hits and errors. Then, when the home team has completed their at-bat, the first player will enter the actual results in cells D23 through D25. The first player will continue to make entries in this manner, so that the block of cells D20 through L25 are filled with his predictions and the actual results from the home team's at-bat.

Cell Block D42 through L47

The block of cells D42 through L47 serve the function of ensuring that if the first player makes a prediction greater than 6 or the actual result is greater than 6, the spreadsheet will treat that number as if it were a 6. The cells in the block are comprised of formulas whose function is to analyze inputs that were made into the block of cells D20 through L25. For example, cell D42 looks to cell D20 and if cell D20 is blank (in other words, the first player has not made any entry at all), cell D42 will return the arbitrary number "999". If cell D20 contains a number that is greater than 6, cell D42 will return a 6. Otherwise, cell D42 will return whatever number has been entered into cell D20. In the same manner, all the other cells in cell block D42 through L47 will analyze cell block D20 through L25, returning either "999", "6", or whatever number was entered into a cell in cell block D20 through L25.

Cell B26 and Cells D26 through L26

Cell B26 contains the label "YOUR SCORE" and shows where the first player's score indicating his accuracy at predicting will be displayed. The purpose of cells D26 through L26 is to analyze cell block D42 through L47 and return a "score" based on the accuracy of prediction. For example, cell D26 first looks to cells D42 through D47. If any of these =999 (indicating blank cells for the predictions or actual results), the cell returns a score of 0. If, however, none of these =999, cell D26 will analyze cells D42 through L47 and return a score in accordance with the following parameters. Every correctly guessed '0' scores one point. Every other correctly guessed prediction is to be tippled. For example, a correctly guessed '2' scores 6 points; a correctly guessed '5' scores 15 points; and a correctly guessed 6 scores 18 points. Whenever a player perfectly predicts all 3 answers for a team's at-bat (i.e., he correctly predicts the runs, hits and errors), the player will receive bonus points as follows: two bonus points if he correctly guesses "0-0-0", six bonus points if he correctly predicts any other sequence. In this same manner, cells D26 through L26 analyze cell block D42 through L47 to determine the first player's score for the home team's at-bat.

FIRST PLAYER—TOTAL SCORE

Cell B28 and Cell D28

Cell B28 displays the label "TOTAL SCORE:". The purpose of cell D28 is to add the first player's score for each inning for both the visitor's at-bat and the home team's at-bat. In other words, cell D28 looks to numeric results of cells D17 through L17 and D26 through L26 and returns their sum.

SECOND PAGE OF THE SPREADSHEET SECOND PLAYER

Cells B3 through B5 and C6

Cells B3 through B5 are the labels "INTELLI*SPORT BASEBALL", "GAME 'A'", and "PLAYER:". Cell C6 is a formula that asks the second player to enter his name into blank cell C5. If cell C5 contains a player's name, cell C6 displays nothing. However, if cell C5 is blank, cell C6 displays the phrase, "Enter Player Name."

Cell G8 and Cells D9 through L9

Cell G8 contains the label "INNINGS". Cells D9 through L9 contain labels describing the inning number (1st through 9th).

SECOND PLAYER—VISITORS

Cells B11, B12, B14, B15, and C11 through C16

Cells B11, B12, B14, B15, and C11 through C16 contain labels that describe the manner in which the second player compares his predictions of the Runs, Hits and Errors of the Visitor's turn at-bat with the actual results of the Visitor's at-bat. For example, in the first inning in cells D11 through D13 the second player enters his predictions of Runs, Hits and Errors. Then, when the visitors have completed their at-bat, the second player will enter the actual results in cells D14 through D16. The second player will continue to make entries in this manner, so that the block of cells D11 through L16 are filled with his predictions and the actual results from the visitor's at-bat.

Cell Block D14 through L16

The purpose of cell block D14 through L16 is to take whatever actual results the first player entered on page "A" for the visitors at-bat and display that result on page "B". For example, cell D14 will look to cell A:D14. If cell A:D14 is blank, cell D14 will display nothing. However, if the first player has entered a number into cell A:D14, cell D14 will return that number. In the same manner, all the cells in cell block D14 through L16 will analyze cell block A:D14 through A:L16, and return either nothing if the cell is blank or whatever number has been entered on the first page.

Cell Block D33 through L35

The block of cells D33 through L35 serve the function of ensuring that if the second player makes a prediction greater than 6, the spreadsheet will treat that number as if it were a 6. The cells in the block are comprised of formulas whose function is to analyze inputs that were made into the block of cells D11 through L13. For example, cell D33 looks to cell D11 and if cell D11 is blank (in other words, the second player has not made any entry at all), cell D33 will return the arbitrary number "999". If cell D11 contains a number that is greater than 6, cell D33 will return a 6. Otherwise, cell D33 will return whatever number has been entered into cell D11. In the same manner, all the other cells in cell block D33 through L35 will analyze cell block D11 through L13, returning either "999", "6", or whatever number was entered into a cell in cell block D11 through L13.

Cell Block D36 through L38

The block of cells D36 through L38 serve the function of ensuring that if the actual result for the visitor's at-bat is greater than 6, the spreadsheet will treat that number as if it were a 6. The cells in the block are comprised of formulas whose function is to analyze inputs that were made into the block of cells A:D14 through A:L16. For example, cell D36 looks to cell A:D14 and if cell A:D14 is blank (in other words, the first player has not made any entry at all), cell D36 will return the arbitrary number "999". If cell A:D14 contains a number that is greater than 6, cell D36 will return a 6. Otherwise, cell D36 will return whatever number has been entered into cell A:D14. In the same manner, all the other cells in cell block D36 through L38 will analyze cell block A:D14 through A:L16, returning either "999", "6", or whatever number was entered into a cell in cell block A:D14 through A:L16.

Cell B17 and Cells D17 through L17

Cell B17 contains the label "YOUR SCORE" and shows where the second player's score indicating his accuracy at predicting will be displayed. Cell block D17 through L17's purpose is to analyze cell block D33 through L38 and return a "score" based on the accuracy of prediction. For example, cell D17 first looks to cells D33 through D38. If any of these =999 (indicating blank cells for the predictions or actual results), the cell returns a score of 0. If, however, none of these =999, cell D17 will analyze cells D33 through L38 and return a score in accordance with the following parameters. Every correctly guessed '0' scores one point. Every other correctly guessed prediction is to be tippled. For example, a correctly guessed '2' scores 6 points; a correctly guessed '5' scores 15 points; and a correctly guessed 6 scores 18 points. Whenever a player perfectly predicts all 3 answers for a team's at-bat (i.e., he correctly predicts the runs, hits and errors), the player will receive bonus points as follows: two bonus points if he correctly guesses "0-0-0", six bonus points if he correctly predicts any other sequence. In this same manner, cells D17 through L17 analyze cell block D33 through L38 to determine the second player's score for the visitor's at-bat.

SECOND PLAYER—HOME TEAM

Cells B20, B21, B23, B24, and C20 through C25

Cells B20, B21, B23, B24, and C20 through C25 contain labels that describe the manner in which the second player compares his predictions of the runs, hits and errors of the home team's turn at-bat with the actual results of the home team's at-bat. For example, in the first inning in cells D20 through D22 the second player enters his predictions of runs, hits and errors. Then, when the home team has completed their at-bat, the second player will enter the actual results in cells D23 through D25. The second player will continue to make entries in this manner, so that the block of cells D20 through L25 are filled with his predictions and the actual results from the home team's at-bat.

Cell Block D23 through L25

The purpose of cell block D23 through L25 is to take whatever actual results the first player entered on page "A" for the visitors at-bat and display that result on page "B". For example, cell D23 will look to cell A:D23. If cell A:D23 is blank, cell D23 will display nothing. However, if the first player has entered a number into cell A:D23, cell D23 will return that number. In the same manner, all the cells in cell block D23 through L25 will analyze cell block A:D23 through A:L25, and return either nothing if the cell is blank or whatever number has been entered on the first page.

Cell Block D42 through L44

The block of cells D42 through L44 serve the function of ensuring that if the second player makes a prediction for the home team greater than 6, the spreadsheet will treat that number as if it were a 6. The cells in the block are comprised of formulas whose function is to analyze inputs that were made into the block of cells D20 through L25. For example, cell D42 looks to cell D20 and if cell D20 is blank (in other words, the second player has not made any entry at all), cell D42 will return the arbitrary number "999". If cell D20 contains a number that is greater than 6, cell D42 will return a 6. Otherwise, cell D42 will return whatever number has been entered into cell D20. In the same manner, all the other cells in cell block D42 through L44 will analyze cell block D20 through L22, returning either "999", "6", or whatever number was entered into a cell in cell block D20 through L22.

Cell Block D45 through L47

The block of cells D45 through L47 serve the function of ensuring that if the actual result for the home team's at-bat is greater than 6, the spreadsheet will treat that number as if it were a 6. The cells in the block are comprised of formulas whose function is to analyze inputs that were made into the block of cells A:D23 through A:L25. For example, cell D45 looks to cell A:D23 and if cell A:D23 is blank (in other words, the first player has not made any entry at all), cell D45 will return the arbitrary number "999". If cell A:D23 contains a number that is greater than 6, cell D45 will return a 6. Otherwise, cell D45 will return whatever number has been entered into cell A:D23. In the same manner, all the other cells in cell block D45 through L47 will analyze cell block A:D23 through A:L25, returning either "999", "6", or whatever number was entered into a cell in cell block A:D23 through A:L25.

Cell B26 and Cells D26 through L26

Cell B26 contains the label "YOUR SCORE" and shows where the second player's score indicating his accuracy at predicting will be displayed. The purpose of cells D26 through L26 is to analyze cell block D42 through L47 and return a "score" based on the accuracy of prediction. For example, cell D26 first looks to cells D42 through D47. If any of these =999 (indicating blank cells for the predictions or actual results), the cell returns a score of 0. If, however, none of these =999, cell D26 will analyze cells D42 through L47 and return a score in accordance with the following parameters. Every correctly guessed '0' scores one point. Every other correctly guessed prediction is to be tippled. For example, a correctly guessed '2' scores 6 points; a correctly guessed '5' scores 15 points; and a correctly guessed 6 scores 18 points. Whenever a player perfectly predicts all 3 answers for a team's at-bat (i.e., he correctly predicts the runs, hits and errors), the player will receive bonus points as follows: two bonus points if he correctly guesses "0-0-0", six bonus points if he correctly predicts any other sequence. In this same manner, cells D26 through L26 analyze cell block D42 through L47 to determine the second player's score for the home team's at-bat.

SECOND PLAYER—TOTAL SCORE

Cell B28 and Cell D28

Cell B28 displays the label "TOTAL SCORE:". The purpose of cell D28 is to add the second player's score for each inning for both the visitor's at-bat and the home team's at-bat. In other words, cell D28 looks to numeric results of cells D17 through L17 and D26 through L26 and returns their sum.

THIRD THROUGH SIXTH PAGE OF THE SPREADSHEET THIRD THROUGH SIXTH PLAYER

The third through the sixth pages of the spreadsheet are set up identically to the second page. The same formulas and labels are placed in the same cells. Where, on the second page of the spreadsheet, a formula refers to entries made on the first page of the spreadsheet; likewise, on the third through sixth page of the spread sheet, the corresponding formula will also refer to entries made on the first page of the spreadsheet.

THE SEVENTH PAGE OF THE SPREADSHEET

The seventh page of the spread sheet contains the scoreboard, as shown in FIG. 8. The purpose of the scoreboard is to keep a running record of the score of each of the players so that each player will know at a glance how he is doing compared to the other players.

Cell F3 and Cells C4 through L4 and Cells A5 through A10 Cell F3 is the label "INNING". Cells C4 through L4 are labels referring to the number of the inning that is being scored and cell L4 is a label that refers to the total score for each player. Cells A5 through A10 contain labels that help identify each player (i.e., Player 'A' is the player whose score is being kept on the first page, Player 'B' is the player whose score is being kept on the second page, etc.).

Cells B5 through B10

The purpose of cells B5 through B10 is to display the actual name of each of the players. For example, player 'A' is supposed to enter his name on the first page of the spreadsheet in cell A:C5. Cell B5 will look to cell A:C5. If the cell is blank, cell B5 will return nothing. However, if cell A:C5 contains a player's name, cell B5 will return that name. In this manner, cells B5 through B10 will look to each page where a player has entered his name and return that name.

Cell Block C5 through L10

The purpose of cell block C5 through L10 is to keep a running score of each player's score inning-by-inning and also a total score for each player. For example, for player 'A', cell C5 looks to the first page of the spreadsheet at cells A:D17 and A:D26 for the score of player 'A' for the first inning. If either of these cells are blank, cell C5 returns nothing. However, if they both are displaying scores, C5 will return the sum of that score for the first inning. Likewise, cells D5 through K5 will return the scores of the second through the ninth inning. Cell G5 will look to the first page of the spreadsheet and return the total score of player 'A', which is displayed in cell A:D28. In this manner, the cells in cell block C5 through L10 will return the scores for each of the players inning-by-inning as well as each player's total score.

Cell C11

Cell C11 is a label that says "INTELLI*SPORT SCOREBOARD".

OTHER VARIATIONS

While the above description contains many specificities, the reader should not construe these as limitations on the scope of the invention, but merely as exemplifications of preferred embodiments thereof. Those skilled in the art will envision many other possible variations that are within its scope.

For example, for the baseball version, scoring for the correct prediction can be based on the difficulty of the guess (i.e., correctly predicting '0' runs scored in an inning will earn 1 point, whereas correctly predicting any number of runs other than '0' would earn the player a number of points equal to three times the number correctly predicted. For example, if a player correctly predicted 4 runs, he gets 12 points.) Another alternative is to award bonus points when the player correctly predicts a specific series of events. For example, if a player correctly predicts the runs, hits and errors in a particular ½ inning, he could get a bonus equal to 3 times the sum of the numbers predicted. For example if a player correctly predicts 2 runs, 3 hits and 0 errors, he gets a bonus of 15 points. While using either the LAN system or the Internet system, (1) it will be possible for the player to predict whether the upcoming batter will make it to first base, (2) the player could make predictions for the first five innings all at once, and then make predictions at every half inning after that, or (3) the player could make predictions for 3 innings at a time (i.e., first inning through the third inning, fourth inning through the sixth inning, seventh inning through the ninth inning).

For the football version, while using either the LAN system or the Internet system, (1) the player can predict if points will be scored on the next play (yes or no), or (2) the player can predict if there will be either: a) points scored by either team, b) offensive gain only with no points, c) interception or fumble recovery by the defense, but not resulting in a touchdown scored by the defense, d) none of the above.

For the basketball version, while using either the LAN system or the Internet system, the player can predict which player will score the next point by entering his jersey number.

For the soccer version, the player can predict how many total points will be scored at the end of each minute of play. While using either the LAN system or the Internet System, the player can predict which player will score the next point by entering his jersey number.

It is also possible that the player could play the game at a gambling casino. The player could watch the match on a television set and make predictions during the event over a LAN system. Also, he could turn in a Scantron scan card before the beginning of the event. If the player is correct in his predictions he would be given money as a prize. Software similar to that described in detail above could be used for games played at Web sites or otherwise over the internet.

These stadium games for fans can also be played by people at home watching television or listening to the radio. The games can also be played in bars or restaurants. Score sheets such as those shown in FIGS. 1B, 2B, 3B, and 4B can be used to play the game. However, for home use, the sheets are scored by one of the players rather than by a computer. Alternatively, the forms shown in the above figures could be modified to include blocks for actual outcomes and the player's scores.

Accordingly, the reader is requested to determine the scope of the invention by the appended claims and their legal equivalents and not by the examples which have been given.

For playing the game at home or in a bar or restaurant using a personal computer as a score board, each player could make his predictions on a standard computer keyboard which is passed around among the players. Also, several keyboards can be used so that each player has his own keyboard with a switch being provided to permit predictions to be made one at a time. Software can be provided to make the switch unnecessary. A special miniaturized keypad can be provided which could be used to feed player predictions into the computer.

I claim:

1. A personal computer that is programmed to determine the winner of a plurality of players making predictions regarding a series of actions during a sports event, said computer comprising:

A) a computer processing unit,

B) a monitor,

C) a keyboard,

D) software comprised of a spreadsheet program which is programmed to accept said predictions and actual actions occurring during said events, measure accuracy of said predictions by comparison with said actual events, and determine winners based on said comparison.

2. A personal computer as in claim 1 wherein at least one prize is awarded based on said scores.

3. A personal computer as in claim 1 wherein said sports event is a baseball game, and said predictions regarding a series of actions comprise predictions of runs, hits and errors for each inning of the baseball game.

4. A personal computer as in claim 1 wherein said sports event is a football game, and said predictions regarding a series of actions comprise predictions of actions taken by the team in possession of the football.

5. A personal computer as in claim 1 wherein said sports event is a basketball game, and said predictions regarding a series of actions comprise predictions of points scored at the end of each minute of play.

6. A personal computer as in claim 1 wherein said sports event is a soccer game, and said predictions regarding a series of actions comprise predictions of points scored at the end of each minute of play and the players who will score the points.

7. A personal computer as in claim 1 wherein said sports event is a golf tournament, and said predictions regarding a series of actions comprise predictions of who the top golfers are and what their scores are.

8. A personal computer as in claim 1 and further comprising a local area network wherein said predictions are transmitted from said player to said analysis location via the stadium's local area network.

9. A game as in claim 1 wherein said game is played at a casino.

10. A game as in claim 1 wherein said players make their predictions at home and said predictions are analyzed and given scores by at least one of said players on a personal computer.

11. A game as in claim 10, wherein said predictions and actual results are entered by players into said personal computer via a keyboard.

12. A personal computer as in claim 1, wherein said spreadsheet is created on Corel Corporation's Quattro Pro 7 spreadsheet program.

13. A personal computer as in claim 1, wherein said spreadsheet comprises a plurality of spreadsheet pages.

14. A personal computer as in claim 13, wherein each of said spreadsheet pages except one comprises prediction data entry for at least one player and one spreadsheet page comprises data display for a scoreboard.

15. A personal computer as in claim 13, wherein data entry for actual actions occurring during the event are made on one of said pages and displayed on a plurality of said pages.

16. A personal computer as in claim 1, wherein said computer processing unit is an IBM clone.

17. A game played by a plurality of fans of a stadium sports event, said plurality of fans defining a plurality of players, said game comprising the steps of:

A) each player makes predictions regarding a series of actions he expects to occur periodically during the event and makes a record of his predictions in a form that is readable by an analysis computer having a location defining an analysis location, B) actual actions occurring during the event are entered into the analysis computer, C) the predictions of each player are analyzed and compared by said analysis computer to the actual actions, scores are given to players based on the accuracy of their predictions, wherein said predictions are transmitted from each player to said analysis computer at said analysis location via the Internet.

18. A game as in claim 17 wherein a fee is charged to player's credit card for the privilege of playing said game and prizes are awarded by applying credit to credit cards of winning players.

* * * * *